(12) United States Patent
Andersen

(10) Patent No.: US 6,692,712 B1
(45) Date of Patent: Feb. 17, 2004

(54) EXHAUST GAS CATALYST COMPRISING RHODIUM, ZIRCONIA AND RARE EARTH OXIDE

(75) Inventor: Paul Joseph Andersen, Plymouth Meeting, PA (US)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 09/720,151

(22) PCT Filed: Jun. 16, 1999

(86) PCT No.: PCT/GB99/01914

§ 371 (c)(1),
(2), (4) Date: Feb. 26, 2001

(87) PCT Pub. No.: WO99/67020

PCT Pub. Date: Dec. 29, 1999

(30) Foreign Application Priority Data

Jun. 22, 1998  (GB) ............................................. 9813367

(51) Int. Cl.$^7$ ............................................. B01D 53/56
(52) U.S. Cl. .................... 423/239.1; 502/303; 502/304; 502/326; 502/349; 60/595; 60/596; 123/434; 180/54.1
(58) Field of Search .......................... 423/213.5, 239.1; 502/303, 304, 326, 349; 180/54.1; 123/434; 60/595, 596

(56) References Cited

U.S. PATENT DOCUMENTS

| 5,015,617 A | 5/1991 | Ohata et al. ................. 502/304 |
| 5,057,483 A | 10/1991 | Wan ........................... 502/304 |
| 5,490,977 A | 2/1996 | Wan et al. ................... 423/270 |
| 5,532,198 A | * 7/1996 | Chopin et al. .............. 502/304 |

FOREIGN PATENT DOCUMENTS

| EP | 0 333 037 | 9/1989 | ............. C01B/3/40 |
| EP | 0 337 809 | 10/1989 | ............. B01J/23/56 |
| EP | 0 427 493 | 5/1991 | ............. B01D/53/36 |
| WO | 97/23278 | 7/1997 | ............. B01D/53/94 |
| WO | 98/03251 | 1/1998 | ............. B01D/53/94 |

OTHER PUBLICATIONS

International Search Report dated Sep. 20, 1999.
British Search Report dated Oct. 23, 1998.

* cited by examiner

Primary Examiner—Stanley S. Silverman
Assistant Examiner—Maribel Medina
(74) Attorney, Agent, or Firm—RatnerPrestia

(57) ABSTRACT

A catalyst comprising rhodium on a support, the support comprising 52–95% zirconia and 5–48% rare earth oxide, based on the total weight of (a) and (b), the concentration of the rhodium on the support being 0.035–0.35% based on the total weight of the rhodium and the support, and the catalyst containing 1.2–4.0 g per in$^3$ (g per 16.4 cm$^3$) in total of (a) and (b).

14 Claims, No Drawings

EXHAUST GAS CATALYST COMPRISING RHODIUM, ZIRCONIA AND RARE EARTH OXIDE

This application is the U.S. national-phase application of PCT International Application No. PCT/GB99/01914.

This invention relates to a catalyst composition and a method of catalysing a chemical reaction employing it.

Rhodium is often used as a catalytically active material in the reduction of nitrogen oxides (NOx) to nitrogen. For this reason it is used as a catalytically active component of a three way catalyst (TWC) to treat engine exhaust gases. Three way catalysts operate by converting NOx to nitrogen CO to $CO_2$ and hydrocarbons (HC) to $CO_2$ and $H_2O$ at or about stoichiometric engine running conditions TWC's achieve high conversions of CO and NOx by containing as catalytically active material a large amount of palladium, for instance 100 g per $ft^3$ ($3.53 \times 10^3$ g $m^{-3}$), or a combination of a small amount of rhodium, for instance 6 g per $ft^3$ (211 g $m^{-3}$), with a moderate amount of palladium, for instance 54 g per $ft^3$ ($1.91 \times 10^3$ g $m^{-3}$), or with a moderate amount of platinum, for instance 33 g per $ft^3$ ($1.17 \times 10^3$ g $m^{-3}$), or with moderate amounts of palladium and platinum. The precious metal components platinum, palladium and rhodium, however, are rare and expensive, and can account for a large proportion of the total cost of a catalyst.

We have now found that by supporting the rhodium only on a support including ceria, zirconia and lanthanum oxide, which support is free from platinum and paladium, that comparable three-way catalytic activity can be achieved without the presence of palladium compared with known three-way catalyst compositions including both rhodium and palladium.

According to one aspect, the invention provides a three way catalyst composition comprising rhodium on a support which is free from platinum and palladium, which support comprising:

(a) 52–88% zirconia
(b') 10–40% ceria, and
(b") 2–8% lanthanum oxide
based on the total weight of (a), (b') and (b") the concentration of the rhodium on the support being 0.035%–0.35% based on the total weight of the rhodium and the support, the catalyst containing 1.2–4.0 g per $in^3$ ($73$–$244 \times 10^{-3}$ g $cm^{-3}$) in total of (a), (b') and (b") and wherein (a), (b') and (b") constitute 90–100% by weight of the support.

This combination of features provides the advantage that the catalyst is cheaper to make because not only is palladium unnecessary, but the amount of rhodium required is less than in prior known catalysts.

A further advantage is that the catalyst of the invention is less sensitive to poisoning by sulphur-containing compounds in engine exhaust gases.

According to a further aspect, the invention provides a method of catalysing a chemical reaction comprising the reduction of nitrogen oxide to nitrogen, which method comprises contacting the nitrogen oxide with a catalyst composition according to the invention.

There is much prior art on catalysts, but none has disclosed the present catalyst.

U.S. Pat. No. 5,057,483 discloses a catalyst composition comprising a carrier on which is disposed a catalytic material, the catalytic material comprising: a first coat carried on the carrier and comprising a first activated alumina support, a catalytically effective amount of a first platinum catalytic component dispersed on the first alumina support, and a catalytically effective amount of bulk ceria; and a second coat carried by the carrier and comprising a co-formed rare earth oxide-zirconia support, a catalytically effective amount of a first rhodium catalytic component dispersed on the co-formed rare earth oxide-zirconia support, a second activated alumina support, and a catalytically effective amount of a second platinum catalytic component dispersed on the second alumina support.

PCT specification WO 98/03251 discloses a method of making a platinum group metal three-way catalyst composition which contains a high temperature catalytic component and a low temperature catalytic component with each catalytic component being present in the catalyst composition as separate distinct particles in the same washcoat layer which method comprises (a) forming on a non-porous substrate a combined washcoat of a high temperature catalyst support material and a low temperature catalyst support material from a slurry in which each of the catalyst support materials is of sufficiently large particle size so as to prevent each catalyst support material from forming a solution or a sol with the liquid medium of the slurry; and (b) impregnating a platinum group metal or metals into each catalyst support material either after formation of the washcoat on the non-porous substrate or before forming the washcoat slurry.

The catalyst composition of the present invention is of surprisingly high activity, especially for the reduction of nitrogen oxide to nitrogen, particularly in combination with the oxidation of CO to $CO_2$. It is also of high activity for the oxidation of HC to $CO_2$ and $H_2O$. It has high thermal durability. Thus, it is particularly effective as a TWC. It does not require the presence of Pt or Pd. The present catalyst contains only a low concentration of Rh on the support, but omitting Pt and Pd from prior art catalyst and including only this low concentration of Rh results in relatively low NOx conversion and low CO and HC conversions. The present catalyst can provide the same conversion of CO to $CO_2$ and of NOx to nitrogen as prior an catalyst containing the same amount of Rh but in addition Pd. The present catalyst is less sensitive to S poisoning than are catalysts based primarily on Pd at high loading.

The catalyst composition of the present invention comprises a low concentration of rhodium on a particular support whose essential components are present in high concentration in the catalyst.

The catalyst can be in conventional form, for instance a pellet bed or foam but preferably a honeycomb monolith through whose holes engine gas flows and in whose holes the rhodium on a support is carried. The catalyst, whether it be a monolith or pellet bed or foam or otherwise will have a certain overall volume, and it is to this volume that the 1.2–4.0 g per $in^3$ ($73$–$244 \times 10^{-3}$ g $cm^{-3}$) concentration of the rhodium support relates. The volume includes the voids within the catalyst, for instance the unoccupied parts of a monolith through which the gas flows; this is a convenient way of expressing the concentration.

The catalyst composition contains 1.2–4.0 g per $in^3$ ($73$–$244 \times 10^{-3}$ g $cm^{-3}$), preferably 1.2–3.2 g, per $in^3$ ($73$–$195 \times 10^{-3}$ g $cm^{-3}$) in total of the rhodium. The concentration of rhodium on the support is 0.035–0.35%, preferably 0.1–0.35%, based on the total weight of the rhodium and the support.

The support of the present invention comprises:
(a) 52–88% zirconia,
(b') 10–40% ceria, and
(b") 2–8% lanthanum oxide based on the total weight of (a), (b') and (b").

Preferably, the support comprises:
(a) 72–82% zirconia
(b') 15–25% ceria, and
(b") 3–5% lanthanum oxide, based on the total weight of (a), (b') and (b").

(a), (b') and (b") preferably constitute 100% of the support though other materials can also be present; alumina, however, is preferably avoided, so as to avoid rhodium-alumina interactions. (a), (b') and (b") constitute 90–100% by weight of the support. Especially preferred is the support consisting essentially of
(a) 72–82% zirconia,
(b') 15–25% ceria, and
(b") 3–5% lanthanum oxide based on the total weight of (a), (b') and (b").

The catalyst composition comprises rhodium on the support. It can contain additional materials, which can be conventional in themselves. For instance, the rhodium on the support can be in admixture with $H_2S$ suppressant material, eg one or more of NiO, $Fe_2O_3$, $Co_3O_4$ and $MnO_2$; NiO is preferred. Alternatively, the $H_2S$ suppressant material can be in a layer over the rhodium on the support. The loading of the $H_2S$ suppressant material is usually 0.05–0.5 g per $in^3$ (3.1–30.5×$10^{-3}$ g $cm^{-3}$)

The rhodium on the support in the composition can be in admixture with material to approve adhesion of a washcoat layer containing the rhodium on the support, for instance adhesion to a monolith, or with material to stabilise the washcoat layer against sintering at high temperatures. A preferred material which performs both functions is particulate oxide which is a mixture of alumina and lanthanum oxide, preferably containing 2–7% lanthanum oxide based on the total weight of the alumina and lanthanum oxide.

The rhodium on the support in the composition can be in admixture with other catalytically active material, particularly comprising one or more of Rh, Pt and Pd, on a separate support. Preferably, however, no other Rh is present By having Pt and/or Pd on this separate support they are distinct from the Rh on the present support. The separate support can be a conventional oxide support. Alternatively, the other catalytically active material on a support can be in a separate layer from the rhodium on the support The catalyst composition usually contains 1–25 g per $ft^3$ (35.3–882.9 g $m^{-3}$), for instance 1–9 g per $ft^3$ (35.3–317.8 g $m^{-3}$) of the rhodium which is on the support comprising (a), (b') and (b").

The catalyst composition can contain promoters. When it contains Pd, base metal promoters such as alkaline earth, for instance Ba, promoters or La or Nd promoters, can be present.

The catalyst composition can be prepared in any appropriate way, for instance a way which is conventional in itself. Rh precursor is preferably deposited on the support comprising (a), (b') and (b"), and the support bearing the Rh precursor calcined. Before or after forming the support the bearing the Rh, the support is preferably coated onto a carrier such as a honeycomb monolith. The coating can be done by dipping the monolith into an aqueous slurry of the support or by passing the monolith through a curtain of the slurry. The slurry contain additional material or precursors thereof, which the catalyst is to contain, such as the materials discussed above. Alternatively or additionally, additional materials, or precursors thereof can be introduced in a layer above or below the layer comprising the rhodium on the support, but this is not preferred. The layer above or below can be induced in an analogous way to that in which the rhodium on the support is in introduced, usually by means of an aqueous slurry.

The Rh precursor can be deposited on the support by impregnating an aqueous solution of Rh precursor, such as $RhCl_3$ or preferably $Rb(NO_3)_3$ into the support. Alternatively, Rh precursor can be deposited on the support by precipitation, for instance by hydrolysis of a Rh salt such as $Rh(NO_3)_3$. Preferably, an aqueous solution of Rh precursor is impregnate into the support the impregnated support is formed into an aqueous slurry, the aqueous slurry is coated on the carrier, and the coated carrier calcined.

The Rh precursor which is deposited on the support can be in admixture with other materials (or precursors thereof), which are to be present in the same layer as the Rh. Alternatively such other materials or precursors can be deposited on the support separately, for instance after coating the support onto the carrier.

The catalyst composition is useful for catalysing a chemical reaction comprising the reduction of nitrogen oxide to nitrogen, by contacting the nitrogen oxide with the catalyst. The catalyst composition is especially useful for combatting air pollution from engine exhaust gas containing nitrogen oxide, carbon monoxide and hydrocarbon, by contacting the exhaust gas with the catalyst The catalyst composition can be used in ways which are conventional in themselves. The engine is preferably that of a vehicle, especially a car. The engine is preferably a petrol (gasoline) engine. The catalyst composition can be positioned close-coupled to the engine or preferably under the floor of the vehicle. The catalyst composition can be employed with other catalysts, for instance it can be employed as an under-floor catalyst in conjunction with a close-coupled catalyst.

The invention is illustrated by the following Examples.

EXAMPLE 1

A CeLa-stabilised zirconia/Rh material, as prepared by impregnating an aqueous solution of $Rh(NO_3)_3$ into a CeLa-stabilised zirconia material by the incipient wetness technique to a concentration of 0.22% Rh by weight. The incipient wetness technique is a known technique, in which a sample of the material to be impregnated is contacted with increasing volumes of water until no more is absorbed so as to determine the maximum volume which the material will hold and then material to be impregnated is contacted with this volume of aqueous solution of impregnant. The CeLa-stabilised zirconia material had a composition of 4% $La_2O_3$, 20% $CeO_2$ and 76% $ZrO_2$. Bulk NiO was slurried in water at a composition of about 4% by weight solids and wet milled to a mean particle size of about 6 microns. After the NiO slurry b been wet milled, the CeLa-stabilised zirconia/Rh was added to it and the resulting slurry was wet milled further to a mean particle size of about 5 microns to form slurry (A) with a solids composition of about 65% by weight. Separately, La-stabilised alumina of composition 4 wt % $La_2O_3$ and 96wt % $Al_2O_3$ was slurried in water at a composition of about 40% by weight solids and then wet milled to a mean particle size of about 5 microns to form slurry (B). Slurry (A) and slurry (B) were blended in the weight ratio (A):(B)=2.42:1 on a solids basis and adjusted to a solids composition of approximately 50% by weight and coated on a conventional cordierite honeycomb monolith having 400 holes per square inch (62 $cm^{-2}$) by dipping. After blowing off the excess washcoat with compressed air, the coated substrate was then dried at 60° C. and calcined at 500° C. in flowing air.

The total loading was 2.39 g per $in^3$ (165×$10^{-3}$ g $cm^{-3}$) with a composition by weight of 29.21% La-stabilised alumina, 66.87% CeLa-stabilised zirconia, 3.77% NiO and 0.15% Rh. Accordingly, the catalyst comprised rhodium on a support consisting of 76% zirconia, 20% ceria and 4% lanthanum oxide and containing 1.60 g per in$^3$ (97.6×10$^{-3}$ g cm$^{-3}$) of the zirconia and rare earth oxide of the zirconia plus rare earth oxide support.

Comparative Example 1

Bulk NiO was slurried in water at a composition of about 4% by weight solids and wet milled to a mean particle size of about 6 microns. Zr-stabilised ceria was added to the resulting NiO slurry which was then wet milled further to a mean particle size of about 5 microns to form slurry (A) with a solids composition of about 65% by weight. The Zr-stabilised ceria had a composition of 58% CeO$_2$ and 42% ZrO$_2$. Separately, La-stabilised alumina of the same composition as that of Example 1 was slurried in water at a composition of about 40% by weight solids and then wet milled to a mean particle size of about 5 microns to form slurry (B). Slurry (A) and slurry (B) were blended in the weight ratio A:B=2.42:1 on a solids basis and adjusted to a solids composition of approximately 50% by weight and coated on a monolith identical to that of Example 1 by dipping. After blowing off the excess washcoat with compressed air, the coated substrate was then dried at 60° C. and calcined at 500° C. in flowing air. The resulting coated substrate was impregnated with Pd:Rh:Nd from a Pd(NO$_3$)$_2$:Rh(NO$_3$)$_3$:Nd(NO$_3$)$_3$ solution which also contained 150 g/litre citric acid, and then again dried at 60° C. and calcined at 500° C. in flowing air. The substrate was then impregnated with barium from a barium acetate solution, and yet again dried at 60° C. and calcined at 500° C. in flowing air.

The total loading was 3.05 g per in$^3$ (186×10$^{-3}$ g cm$^{-3}$) with a composition by weight of 23.0% La-stabilised alumina, 52.5% Zr-stabilised ceria, 3.0% NiO, 7.0% Nd$_2$O$_3$, 13.4% BaO, and 0.99% Pd and 0.11% Rh. Accordingly, the catalyst comprised rhodium on a support consisting of 58% ceria and 42% zirconia, and contained 1.60 g per in$^3$ (97.6×10$^{-3}$ g cm$^{-3}$) in total of the zirconia and rare earth oxide of the zirconia plus rare earth oxide sort This catalyst is a commercially available TWC.

Comparative Example 2

Comparative Example 1 was repeated except that no Pd(NO$_3$)$_2$ was employed, so that the product contained no Pd.

The total loading was 3.01 g per in$^3$ (183.7×10$^{-3}$ g cm$^{-3}$) with a composition by weight of 23.19% La-stabilised alumina, 53.10% Zr-stabilised ceria, 2.99% NiO, 6.98% Nd$_2$O$_3$, 13.62% BaO and 0.12% Rh. Accordingly, the catalyst comprised rhodium on a support consisting of 58% ceria and 42% zirconia, and contained 1.60 g per in$^3$ (97.6×10$^{-3}$ g cm$^{-3}$) of the zirconia and rare earth oxide of the zirconia plus rare earth oxide support.

EXAMPLE 2 and Comparative Examples 3 and 4

The catalysts described in Example 1 and Comparative Examples 1 and 2 were each aged on an engine dynamometer cycle which simulates 100,000 miles of road ageing. The cycle had catalyst temperatures ranging from 850° C. to 1000° C. and a duration of 120 hours. After this ageing the catalyst was fixed to a test engine dynamometer and the percent conversions of hydrocarbon (HC), carbon monoxide (CO) and nitrogen oxide (NOx) in the exhaust gas measured at various air/fuel ratios with an exhaust gas temperature at catalyst inlet of 450° C. At a particular air/fuel ratio (which is near the stoichiometric ratio), the CO and NOx percent conversions are equal and this conversion value is referred to as the CO/NOx cross-over point (COP). The COP for each catalyst after ageing is shown in Table 1 together with the HC efficiency at the same air/fuel ratio at which the COP occurs. The COP and HC efficiencies together represent the TWC activity.

TABLE 1

TWC Activity After 100,000 Miles Simulated Road Ageing

|  | Catalyst | Sweep Cross-over (% Conversion) | |
|---|---|---|---|
|  |  | HC | CO/NOx |
| Example 2 | Example 1 | 81 | 89 |
| Comparative Example 3 | Comparative Example 1 | 89 | 87 |
| Comparative Example 4 | Comparative Example 2 | 44 | 44 |

Each of the catalysts contained substantially the same amount of Rh, but it can be seen from the Table that the catalyst of Example 1 had CO and NOx conversion activities which were equivalent to those of a standard TWC which contained in addition a significant quantity of the expensive precious metal Pd. It can also be seen that merely omitting Pd from the standard TWC resulted in a drastic loss in activity.

EXAMPLE 3

The procedure of Example 1 was followed except that the concentration of Rh in the impregnated CeLa-stabilised zirconia was 0.11% by weight and the total loading was 4.70 g per in$^3$ (286.8×10$^{-3}$ g cm$^{-3}$) the composition being by weight 68.09% CeLa-stabilised zirconia, 29.78% La-stabilised alumina, 1.92% NiO and 0.076% Rh.

EXAMPLE 4

The catalyst of Example 3 was tested in the procedure described in Example 2, and gave the following results.

TABLE 2

TWC Activity After 100,000 Miles Simulated Road Ageing

| Sweep Cross-over (% Conversion) | |
|---|---|
| HC | CO/NOx |
| 77 | 81 |

Within the standard deviations experienced in these tests the results shown in Table 2 are equivalent to those shown for Example 2 in Table 1.

What is claimed is:

1. A three way catalyst composition comprising rhodium on a first support which is free from platinum and palladium, said first support comprising:
   (a) 52–88% zirconia, and
   (b') 10–40% ceria, and
   (b") 2–8% lanthanum oxide
      based on the total weight of (a), (b') and (b"), the concentration of the rhodium on the first support being 0.035–0.35% based on the total weight of the rhodium and the first support, the catalyst containing 1.2–4.0 g per in$^3$ in total of (a), (b') and (b") and wherein (a), (b') and (b") constitute 90–100% by weight of the first support.

2. A catalyst composition according to claim 1, wherein the first support comprises:
   (a) 72–82% zirconia,
   (b') 15–25% ceria, and
   (b") 3–5% lanthanum oxide
   based on the total weight of (a), (b') and (b").

3. A catalyst composition according to claim 1, wherein said rhodium is present at 1–25 g per $ft^3$.

4. A catalyst according to claim 1, further comprising an $H_2S$ suppressant material.

5. A catalyst composition according to claim 1, further comprising a particulate oxide.

6. A catalyst composition according to claim 5, wherein the particulate oxide is a mixed oxide of lanthanum and aluminum.

7. A catalyst composition according to claim 1, further comprising platinum and/or palladium on a second support.

8. A carrier including a catalyst composition according to claim 1, which carrier is selected from the group consisting of a honeycomb monolith, a pellet bed, and foam.

9. A method of catalysing a chemical reaction comprising the reduction of nitrogen oxide to nitrogen, which method comprises contacting the nitrogen oxide with a catalyst composition according to claim 1.

10. An exhaust system for an internal combustion engine including a catalyst composition according to claim 1.

11. An internal combustion engine including an exhaust system according to claim 10.

12. An engine according to claim 11, wherein said engine is a gasoline engine.

13. A vehicle including an engine and an exhaust system, according to claim 11.

14. A method of reducing nitrogen oxides to nitrogen, oxidizing carbon monoxide to carbon dioxide and/or oxidizing hydrocarbons to carbon dioxide and water, said nitrogen oxides, hydrocarbons and carbon monoxide being present in an exhaust gas of a stoichiometrically operated internal combustion gasoline engine, said method comprising reducing nitrogen oxides by contacting a three way catalyst composition according to claim 1 with the exhaust gas, oxidizing carbon monoxide by the step of contacting the composition with the exhaust gas, and oxidizing hydrocarbons by the step of contacting the composition with the exhaust gas.

* * * * *